March 3, 1953 P. PONTRELLO 2,630,024
DIFFERENTIAL DRIVE MECHANISM
Filed Oct. 23, 1950

INVENTOR
Pasquale Pontrello
By Walter P. Guyer
ATTORNEY

Patented Mar. 3, 1953

2,630,024

UNITED STATES PATENT OFFICE 2,630,024

DIFFERENTIAL DRIVE MECHANISM

Pasquale Pontrello, Buffalo, N. Y.

Application October 23, 1950, Serial No. 191,537

6 Claims. (Cl. 74—711)

This invention relates to certain new and useful improvements in the differential drive assembly of motor vehicles.

It has for its primary object to provide a differential mechanism which is so designed and constructed as to assure at all times and under any conditions of traction a positive transmission of power to both wheels, wherein there is no lost motion or spinning of the driven members or traction wheels, and which permits the normal differential effect or operation required when the vehicle makes a turn in either direction.

Another object of the invention is to provide simple and positive means for automatically transmitting power to both wheel-axles simultaneously to rotate as a unit under all driving conditions.

Other features of the invention reside in the construction and arrangement of parts hereinafter described and particularly pointed out in the appended claims.

Figure 1:
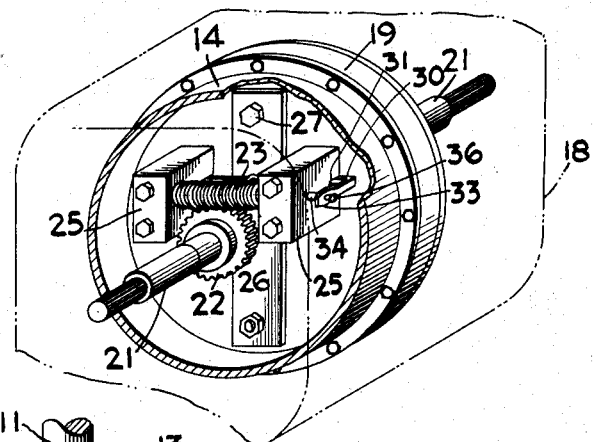
Figure 2:
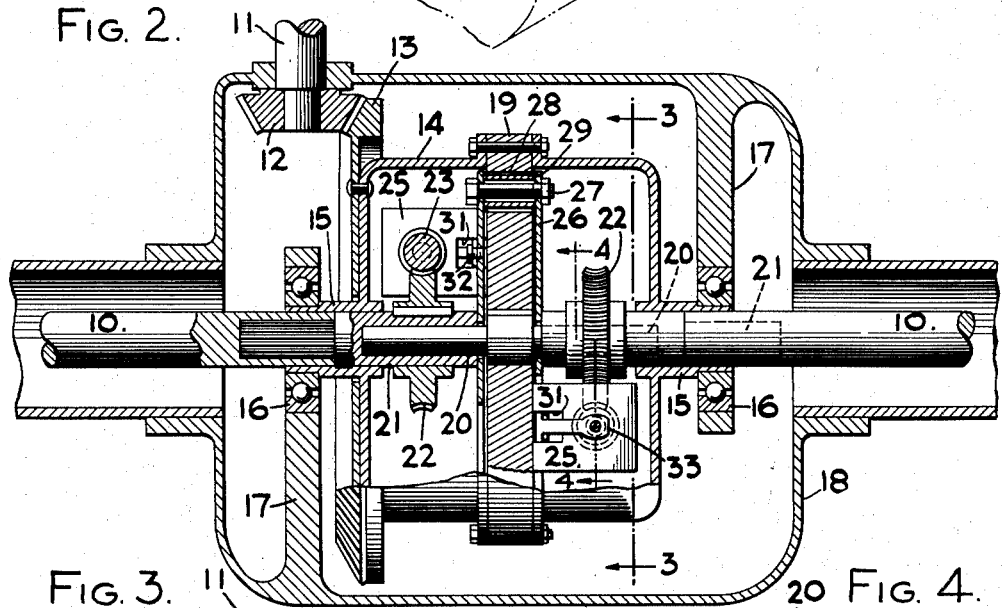
Figure 3:
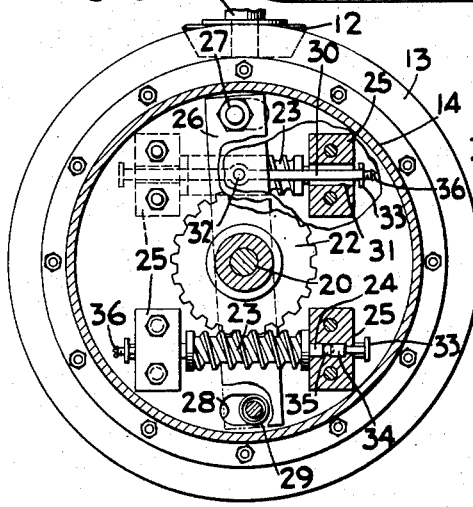
Figure 4:
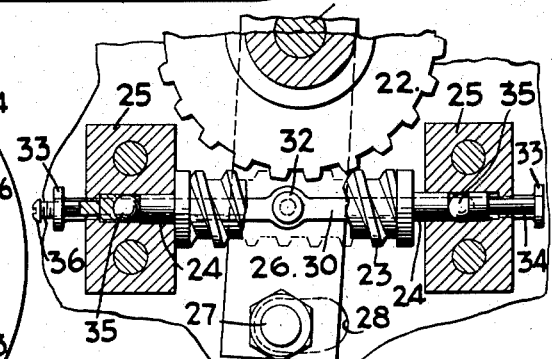

In the accompanying drawings:

Figure 1 is a perspective view, partly in section, of the differential mechanism embodying my invention. Figure 2 is an enlarged central longitudinal section thereof. Figure 3 is a cross section taken substantially in the plane of line 3—3, Figure 2. Figure 4 is an enlarged fragmentary cross section taken on line 4—4, Figure 2.

Similar characters of reference indicate corresponding parts throughout the several views.

Referring now to the drawings showing the preferred embodiment of my invention, 10, 10 indicate the usual axle-sections of a vehicle on which the rear wheels are mounted and which are adapted to be independently driven, and 11 indicates the motor-driven transmission shaft having the usual drive pinion 12 thereon meshing with the ring gear 13 applied to a rotatable differential casing 14 in which the operating parts of my differential mechanism are arranged. This differential casing has its end hubs 15, 15 journaled in bearings 16 supported in companion internal arms 17 formed on a housing 18 in which the casing and axle-sections revolve.

The casing 14 is split transversely and bolted thereto between its split ends is a disk or division plate 19 from the opposite sides of which axial trunnions 20 extend. Supported on these trunnions and in the casing-hubs 15, 15 to rotate thereon are longitudinally-alined driven shafts 21 which are splined to the companion axle-sections 10, 10. Keyed to each of these shafts at opposite sides of the division plate 19 is a worm wheel 22 which meshes with a companion axially-shiftable worm 23 disposed transversely of the differential casing with its shaft-ends 24 journaled in bearing-blocks 25 bolted or otherwise secured to the opposite side faces of the division plate. These bearing-blocks are so spaced as to permit a limited endwise movement of the worm therebetween, with the worm normally abutting at one end against one or the other of the blocks, as seen in Figure 4. If desired, a second set of worm assemblies may be mounted at either side of this plate and in diametrically opposing relation to each of the worms shown in the drawings to thereby provide a plurality of normal driving connections between the driven differential casing 14 and the axle-sections.

Disposed to operate in a plane between the bearing-blocks 25 and applied to opposite sides of the division plate 19 of the differential casing and extending diametrically thereof to pivot about the axis thereof are companion vertically-swinging rock members or bars 26 joined at their free ends by transverse tie bolts 27 extending through companion arcuate slots 28 in plate 19 and having rollers 29 thereon engaging said slots for limiting the rocking movements of the bars. While these bolt and slot connections are shown somewhat exaggerated in the drawings, in practice the slots are of a length to provide only for play purposes. These bars are operatively connected to the companion shiftable worms 23 in a bridging or tie-like fashion to govern their shifting movements and for this purpose each has a yoke-like member 30 extending through openings 31 formed in the bearing-blocks and fulcrumed intermediate its ends at 32 to its companion bar, while its opposite or free end portions or arms 33 extend outwardly about the outer sides of the adjoining bearing-blocks in spaced relation thereto and abut at their opposing or inner faces against the outer ends of displaceable pins or plungers 34 guided for longitudinal movement in the bearing-blocks in axial alinement with the opposing shaft-ends 24 of the companion shiftable worm 23. It should be pointed out here that in this yoke-like connection between each of the rock bars 26 and the ends of the companion worm-shaft 24, a sloppy fit or slight clearance is provided, say approximately .002 of an inch, between the opposing ends of the yoke-arms 33 and the companion plungers 34 for the purpose of permitting an independent axial displacement of the worm 23 relative to this yoke-connection to a position where both its end faces are spaced clear of thrust or abutting engagement with the bearing-blocks 25, and which clearance position takes place differentially when the outside wheel of the vehicle turns faster than that imparted to it from the differential casing. In this position the worm is free to be turned idly by its companion worm wheel 22. Disposed between the opposing ends of these pins 34 and the shaft-ends are balls 35 which serve as anti-friction bearings and complete the tie between the ends of the worm and the yoke member, so that when the latter is caused to shift in one direction or the other, in response to a thrust shift transmitted to the rock bars 26 from a corresponding turning of the division plate 19 with the differential casing 14, the companion worm 23 is compelled to shift in a like direction into abutting engagement with the opposing wall of one or the other of the bearing-blocks 25, as shown in Figure 4.

During normal driving operations, the differential casing 14 is turned by the engine from the transmission shaft 11 and interposed pinion 12 and ring gear 13, while the pinions 23 on the casing plate 19 are at such time held against turning about their own axes and are locked with the worm wheels 22 to cause the wheel-axles 10, 10 to be turned. The pinions are held against turning by an end thrust engagement against the opposing face of one of their companion bearing blocks 25 effected by the displacement of the rock bars 26 and yoke members 30 in response to the turning movement imparted to the casing 14, and both axles are caused to turn as a unit with like driving power in either a forward or backward direction as determined by the direction of turning imparted to the transmission shaft. While positively providing power to both axles and wheels at all times and under all conditions and without lost motion to any of its parts, this assembly also differentiates effectively. In this connection, when the vehicle turns a corner and the outside wheel turns faster than the differential casing, then the companion worm 23 will be automatically shifted or released from its end thrust contact with the adjoining bearing block 25 and permit the differential turning of the companion worm wheel 22 and the casing.

A set screw 36 may be connected to one end of the yoke member for the purpose of effecting a finer adjustment of the worm 23 in relation to its bearing blocks.

I claim as my invention:

1. In a differential mechanism, a driven casing having alined shaft-receiving hubs at its opposite ends and a substantially centrally-disposed division plate therein having trunnions extending from opposite sides thereof and transversely spaced bearing members on such opposite sides, driven axle-engaging shafts supported to rotate on said trunnions and said casing-hubs and having worm wheels fixed thereon, axially-shiftable worms in meshing engagement with the companion worm wheels and journaled at their ends in and between said bearing members for limited thrust displacement into and out of abutting engagement with the opposing faces of such bearing members, and means constituting a displaceable operative connection between said casing and each of said worms for governing their axial shifting movements.

2. In a differential mechanism, a driven casing having alined shaft-receiving hubs at its opposite ends and a substantially centrally-disposed division plate therein having trunnions extending from opposite sides thereof and transversely spaced bearing members on such opposite sides, driven axle-engaging shafts supported to rotate on said trunnions and said casing-hubs and having worm wheels fixed thereon, axially-shiftable worms journaled at their ends in and between said bearing members for end thrust engagement therewith and in meshing engagement with the companion worm wheels, and transversely-shiftable connections operatively disposed between said casing-plate and the opposite ends of said companion worms to govern their shifting movements.

3. In a differential mechanism, a driven casing having alined shaft-receiving hubs at its opposite ends and a substantially centrally-disposed division plate therein having trunnions extending from opposite sides thereof and transversely spaced bearing members on such opposite sides, driven axle-engaging shafts supported to rotate on said trunnions and said casing-hubs and having worm wheels fixed thereon, axially-shiftable worms journaled at their ends in and between said bearing members for end thrust engagement therewith and in meshing engagement with the companion worm wheels, rock members fulcrumed about the axis of said casing at opposite sides of its division plate for limited rocking movement relative thereto, and yoke-like members operatively connecting said rock members with the opposite ends of said companion worms.

4. In a differential mechanism, a driven casing having alined shaft-receiving hubs at its opposite ends and a substantially centrally-disposed division plate therein having trunnions extending from opposite sides thereof and transversely spaced bearing members on such opposite sides, driven axle-engaging shafts supported to rotate on said trunnions and said casing-hubs and having worm wheels fixed thereon, axially-shiftable worms journaled at their ends in and between said bearing members for end thrust engagement therewith and in meshing engagement with the companion worm wheels, rock members fulcrumed about the axis of said casing at opposite sides of its division plate including means for limiting their rocking movement relative thereto, and yoke-like members pivoted intermediate their ends to said companion rock members and in embracing relation at their ends about the companion bearing members and in registering alinement with the axes of the respective worms.

5. In a differential mechanism, a driven assembly including a disk-like plate and axle-engaging shafts supported axially relatively thereto and having worm wheels fixed thereon, axially-shiftable worms journaled on the opposite sides of said plate transversely thereof for limited end thrust displacement and in meshing engagement with the companion worm wheels, and means applied to said plate in the path of the end displacement of said shiftable worms and against which the latter are adapted to alternately and releasably abut for locking the same against relative turning in response to a shifting of the worms in one direction or the other.

6. In a differential mechanism, a driven assembly including a disk-like plate and axle-engaging shafts supported axially relatively to and having worm wheels fixed thereon, axially-shiftable worms journaled on the opposite sides of said plate transversely thereof for limited end thrust displacement and in meshing engagement with the companion worm wheels, means engageable with said worms in their end thrust shifted positions for holding them against relative turning and for releasing them for relative turning in another shifted position, and rock members fulcrumed about the axis of said plate at opposite sides thereof and operatively connected to the opposite ends of the companion worms to govern their shifting movements.

PASQUALE PONTRELLO.

REFERENCES CITED

The following references are of record in the file of this patent:

UNITED STATES PATENTS

| Number | Name | Date |
|---|---|---|
| 1,401,204 | Storey | Dec. 27, 1921 |
| 2,000,223 | Du Pras | May 7, 1935 |
| 2,462,000 | Randall | Feb. 15, 1949 |
| 2,550,750 | Ahelt | May 1, 1951 |